United States Patent [19]

Hack, Jr.

[11] Patent Number: 4,874,013
[45] Date of Patent: Oct. 17, 1989

[54] EMERGENCY FUEL SYSTEM APPARATUS

[76] Inventor: J. Roy Hack, Jr., 5405 S. Rosemont, Tucson, Ariz. 85706

[21] Appl. No.: 269,294

[22] Filed: Nov. 10, 1988

Related U.S. Application Data

[63] Continuation-in-part of Ser. No. 111,818, Oct. 22, 1987, abandoned.

[51] Int. Cl.⁴ ............................ F03B 11/00; F02M 59/00
[52] U.S. Cl. ................................ 137/571; 137/566; 123/510
[58] Field of Search ............... 137/565, 566, 568, 569, 137/573, 592, 571; 123/510

[56] References Cited

U.S. PATENT DOCUMENTS

| | | | |
|---|---|---|---|
| 1,348,406 | 8/1920 | Green | 123/510 |
| 1,424,486 | 8/1922 | Kinzie | 123/510 |
| 1,712,492 | 5/1929 | Dienner | 123/510 |
| 1,857,004 | 5/1932 | Rebillet | 137/566 |
| 2,955,609 | 10/1960 | Gaubatz | 137/566 |
| 2,969,803 | 1/1961 | Mosher | 137/571 |
| 3,101,771 | 8/1963 | McCuen | 137/571 |
| 3,254,697 | 6/1966 | Parks | 137/566 |
| 3,473,523 | 7/1968 | Hilbern | 123/510 |
| 3,786,835 | 1/1974 | Finger | 137/566 |
| 4,582,039 | 4/1986 | Nishida | 123/510 |
| 4,664,134 | 8/1987 | Pera | 137/571 |

Primary Examiner—A. Michael Chambers
Attorney, Agent, or Firm—H. Gordon Shields

[57] ABSTRACT

Emergency fuel system apparatus includes two emergency fuel tanks, a relatively primary fuel tank or reservoir disposed adjacent to a vehicle in a fuel tank and a secondary fuel reservoir which holds a relatively small amount of fuel, disposed adjacent to a carburetor or to a fuel injection system. The secondary emergency fuel reservoir provides immediate fuel for an engine during the interval between the time when fuel starvation announces that the vehicle has run out of fuel and the time required for fuel to flow from the primary emergency fuel reservoir to the carburetor or fuel injection system.

16 Claims, 2 Drawing Sheets

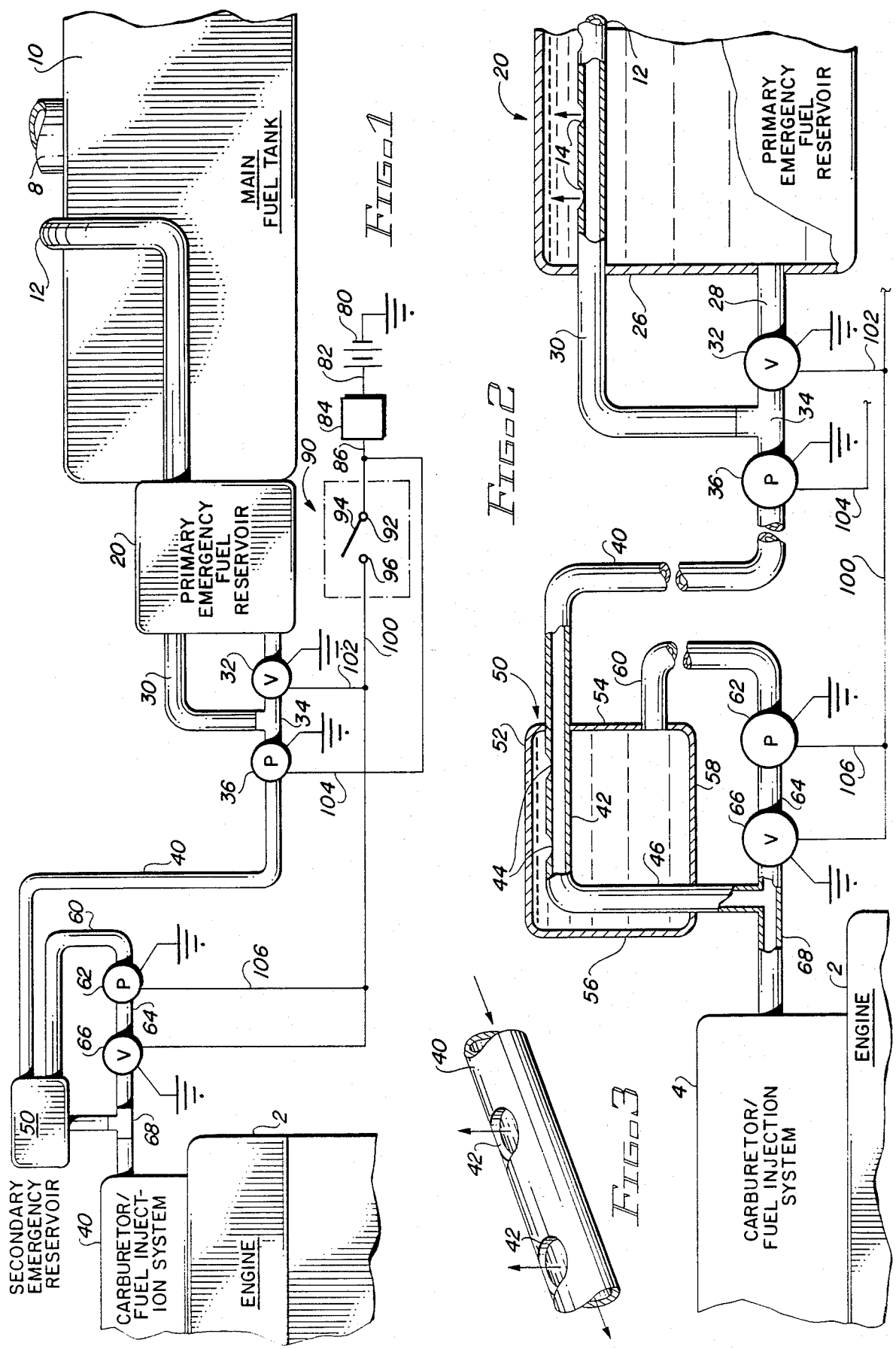

EMERGENCY FUEL SYSTEM APPARATUS

CROSS-REFERENCE TO RELATED APPLICATION

This application is a continuation-in-part application of copending application Ser. No. 111,818, filed October 22, 1987, and now abandoned.

BACKGROUND OF THE INVENTION

1. Field of the Invention

This invention relates to an emergency fuel supply and, more particularly, to an emergency fuel system for a vehicle, and the system includes two emergency fuel reservoirs.

2. Description of the Prior Art (Hack) U.S. Pat. No. 3,916,938 discloses emergency fuel reservoir which is filled from a main fuel tank and is preferably located adjacent to a vehicle's main fuel tank. As a matter of fact, the emergency fuel reservoir may be located within the tank.

There are other emergency fuel tanks which have been patented also. However, generally all of the prior art emergency fuel tanks have a common problem. That one problem is simply that it takes time for fuel to flow from the emergency fuel reservoir to the engine, or rather to either a carburetor or to a fuel injection system, and during that time the engine, of necessity, slows down or quits completely.

The apparatus of the present invention overcomes the problem of the prior art systems by incorporating two separate fuel reservoirs, a primary fuel reservoir and a secondary fuel reservoir. The secondary fuel reservoir preferably holds only a few ounces of fuel and is located immediately adjacent to a carburetor or to a fuel injection system so that it furnishes fuel substantially immediately to the carburetor or to the fuel injection system to keep the engine running during the few seconds that it takes for the fuel to flow from the primary emergency fuel tank to the engine.

SUMMARY OF THE INVENTION

The invention described and claimed herein comprises an emergency fuel system having a primary fuel reservoir and a secondary fuel reservoir. The primary fuel reservoir is a relatively large reservoir and is located adjacent to a main fuel tank of a vehicle. The secondary fuel reservoir is relatively small, and it is located adjacent to a vehicle's carburetor or fuel injection system.

Among the objects of the present invention are the following:

To provide new and useful emergency fuel tank apparatus;

To provide new and useful emergency fuel reservoir including a primary reservoir and a secondary reservoir;

To provide a new and useful emergency fuel system having two separate fuel reservoirs;

To provide a new and useful emergency fuel system having a relatively large emergency fuel reservoir and a relatively small fuel reservoir; and To provide a new and useful emergency fuel system having a pair of emergency fuel reservoirs controlled by a single control.

BRIEF DESCRIPTION OF THE DRAWING

FIG. 1 is a schematic side view of the apparatus of the present invention.

FIG. 2 is an enlarged side view in partial section of portions of the apparatus of FIG. 1.

FIG. 3 is an enlarged perspective view of a portion of the apparatus of the present invention.

DESCRIPTION OF THE PREFERRED EMBODIMENT

Figure 4:
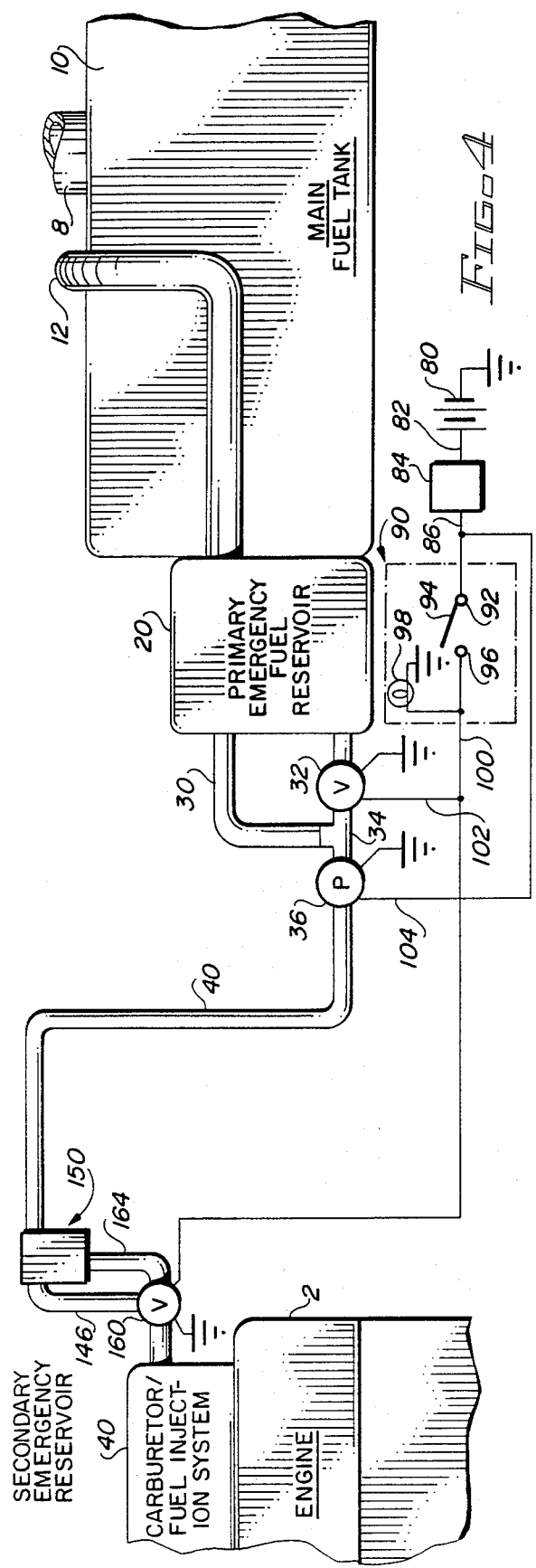
FIG. 4 is a schematic side view of an alternate embodiment of the apparatus of the present invention.

FIG. 1 is a schematic representation of the apparatus of the present invention in its use environment, showing the primary elements involved in both the invention and the use environment. FIG. 2 is an enlarged view in partial section of a portion of the apparatus of the present invention. FIG. 3 is a perspective view of a portion of the apparatus of the present invention illustrating the flow of fuel in portions of the apparatus of the present invention. In the following discussion, reference will be made to FIGS. 1, 2, and 3.

An engine 2 is schematically illustrated, along with a carburetor or fuel injection system 4 associated with the engine 2. It will be understood that the apparatus of the present invention provides emergency fuel for operating the engine 2. Whether the engine 2 includes a carburetor or a fuel injection system is relatively immaterial. Accordingly, the engine 2 and the particular fuel system 4 are merely schematically illustrated.

A main fuel tank 10 of the vehicle in which the apparatus of the present invention is disposed is shown in FIG. 1. A conduit 12 is shown extending from the main fuel tank to a primary emergency fuel reservoir 20. The primary emergency fuel reservoir 20 is shown disposed adjacent to the main fuel tank 10. It will be understood that the primary emergency fuel reservoir 20 maybe disposed adjacent to the fuel tank 10, it may be spaced apart therefrom, or it may be disposed within the main fuel tank 10, as desired, or as convenient. The primary emergency fuel reservoir, however, is filled from the main fuel tank 10, and it does not have a separate source for the fuel stored therein.

A conduit 12 extends from the main fuel tank 10 to the primary emergency fuel reservoir 20. A conduit 30 extends from the conduit 12 at the primary emergency fuel reservoir 20 outwardly from the reservoir. The conduit 30 carries fuel ultimately from the main fuel tank 10 to the fuel system 4 of the engine 2. The conduit 30 extends to a conduit 34 which is adjacent to a pump 36. The conduit 34 extends between a valve 32 and the pump 36. The pump 36 is the main or primary fuel pump for the vehicle in which the apparatus of the present invention is located. The pump 36 is schematically illustrated as an electric pump, but it may also be an engine driven pump, if desired.

Referring primarily to FIG. 2, the conduit 12 extends through the primary emergency fuel reservoir 20 and continues outwardly from the primary fuel emergency reservoir 20 through a side wall 26 of the reservoir 20 as the conduit 30. The conduit 12 includes a plurality of apertures 14 through which fuel flows from the conduit 12 to the reservoir 20.

During common or ordinary operation of the vehicle in which the present apparatus is disposed, the primary reservoir 20 is kept substantially full of fuel at all times. With the reservoir 20 substantially full, fuel will flow relatively uninterruptedly through the conduit 12, out of the reservoir 20 through the conduit 30, to the conduit 34 and to the fuel system for the engine 2 in response to the pump 36.

A primary emergency fuel conduit 28 also extends through the side wall 26 of the primary emergency fuel reservoir 20. The conduit 28 extends to the valve 32. The valve 32 is an electrically controlled, normally closed valve. The fuel conduit 34 extends between the valve 32 and the pump 36.

When the valve 32 is actuated, or opened, the fuel stored in the primary emergency fuel reservoir 20 flows through the conduit 28, to the valve 32, and through the conduit 34 to the pump 36.

It will be noted that the conduit 28 is disposed slightly above the bottom of the primary emergency fuel reservoir 20. The fuel flowing through the conduit 28 accordingly will not generally include the sediment, etc., which normally settles to the bottom of any fuel reservoir.

From the pump 36, a fuel conduit 40 extends to a secondary emergency fuel reservoir 50. The secondary emergency fuel reservoir 50 is disposed immediately adjacent to, or next to, the fuel distribution system 4, whether it be a carburetor or a fuel injection system. While the primary emergency fuel reservoir 20 may contain any desired amount of fuel, for example up to about a gallon, the secondary emergency fuel reservoir 50 preferably contains only a few ounces, such as three or four ounces. The purpose of the secondary emergency fuel reservoir 50 is to provide sufficient fuel to run the engine normally during the interval of time required for fuel to flow from the primary emergency fuel reservoir 20 to the fuel system 4.

The secondary emergency fuel reservoir 50 is a miniature version of the primary emergency fuel reservoir 20. As best shown in FIG. 2, the reservoir 50 includes a top wall 52, a pair of side walls 54 and 56, and a bottom wall 58.

The conduit 40 is shown extending into the reservoir 50 through the side wall 54 adjacent to the top wall 52. The conduit 40, for illustrative purposes, includes a horizontal leg 42 within the reservoir 50 and a downwardly extending or vertically extending leg 46. The vertical leg 46 extends through the bottom wall 58 and extends to a fuel conduit 68. A check valve 48 is disposed in the conduit leg 48 adjacent to the conduit 68.

A pair of apertures 44 are shown extending through the fuel conduit leg 42 within the reservoir 50. In FIG. 3, arrows illustrate the flow of fuel in the conduit leg 40 and outwardly from the conduit leg 40 through the apertures 42. Thus, the reservoir 50 is filled from the conduit 40 in substantially the same manner as the reservoir 20 is filled from the conduit 12.

A fuel conduit 60 is shown extending outwardly from the reservoir 50 through the side wall 54. The conduit 60 is disposed slightly above the bottom wall 58 to avoid the flow of sediment, etc.

The conduit 60 extends to a pump 62, which may or may not be needed. A conduit 64 extends from the pump 62 to a valve 66. The conduit 68 extends from the valve 66 to the fuel system 4.

The valves 32 and 66 are both normally closed, electrically actuated valves. The pumps 36 and 62 are both shown as electrically operated pumps.

In FIG. 1, a battery 80 is schematically illustrated. The battery 80 has a negative terminal appropriately grounded and a conductor 82 extends from the positive terminal of the battery 80 to an ignition switch 84. A conductor 86 extends from the ignition switch 84 to an emergency fuel supply switch 94 on a control panel 90. The control panel 90 is appropriately mounted adjacent to the driver, as on or under, etc., the vehicle dashboard.

The control panel 90 includes a terminal or switch contact 92, and a conductor 86 extends from the ignition switch 84 to the terminal 92. An armature or movable switch contact 94 is movable between the terminal 92 to which it is connected and a terminal or switch contact 96. The switch 94, with its terminals or contacts 92 and 96, is preferably simply a toggle switch having an "on" position and an "off" position. A conductor 100 extends from the terminal or contact 96 to the valve 66.

A lamp 98 is connected to conductor 100. When the switch contact 94 is closed, the lamp 98 illuminates to indicate visually that the emergency fuel system is being employed. When the switch contact 94 is opened, the lamp 98 turns off.

A conductor 102 extends from the conductor 100 to the valve 32. A conductor 104 extends from the pump 62 to the conductor 100. Thus, the valves 32 and 66, and the emergency fuel pump 62 are controlled by the switch 90.

A conductor 104 extends from the fuel pump 36 directly to the conductor 86. This is necessary since the pump 36 is the main fuel pump for the vehicle in which the apparatus is disposed, and accordingly is not controlled by the switch 94, but rather by the ignition switch 84.

When the driver of the vehicle in which the apparatus of the present invention is disposed runs out of fuel, the switch 90 is actuated to open the valves 32 and 66 and, if desired or if necessary, to provide power for the pump 62. Fuel from the primary emergency fuel reservoir 20 flows through the conduit 30 and through the now opened valve 32 and the conduit 34 to the pump 36. The fuel is then pumped through the conduit 40 and through the secondary fuel reservoir, the conduit 46, and the conduit 68 to the fuel system 4.

During the interval of time required for the fuel to flow from the reservoir 20 to the fuel system 4, the relatively small fuel supply from the secondary reservoir 50 flows through the conduit 60 and through the valve 66 and the conduit 68 to the fuel supply 4. Since the reservoir 50 is disposed immediately adjacent to the fuel system 4, when the valve 66 is actuated fuel is substantially immediately available to the fuel system 4 for the engine 2.

If necessary, or if desired, the pump 62 may be included in the line 60 to pump fuel from the reservoir 50 through the conduit 64, the valve 66, and the conduit 68 to the fuel system 4. Under some circumstances, such as with a fuel injection system, the pump 62 may be necessary to provide fuel from the reservoir 50 under sufficient pressure to operate the fuel system 4. Accordingly, the provision of the pump 62 may be required for fuel injection systems, and it mayor may not be necessary or advantageous for carburetted systems. However, for immediacy, even for carburetted systems, a pump may be desired.

The check valve 48 in the conduit 46 adjacent to the conduit 68 insures that fuel flows in one direction only, as indicated by the arrow in FIG. 2. The check valve 48 prevents emergency fuel from flowing back through the conduit 46 when valve 66 is opened to allow emergency fuel to flow through conduit 60 to conduit 66. The check valve 48 is particularly necessary if pump 62 is utilized to prevent pressurized fuel from flowing upwardly in the conduit 46 from the conduit 46.

Figure 5:
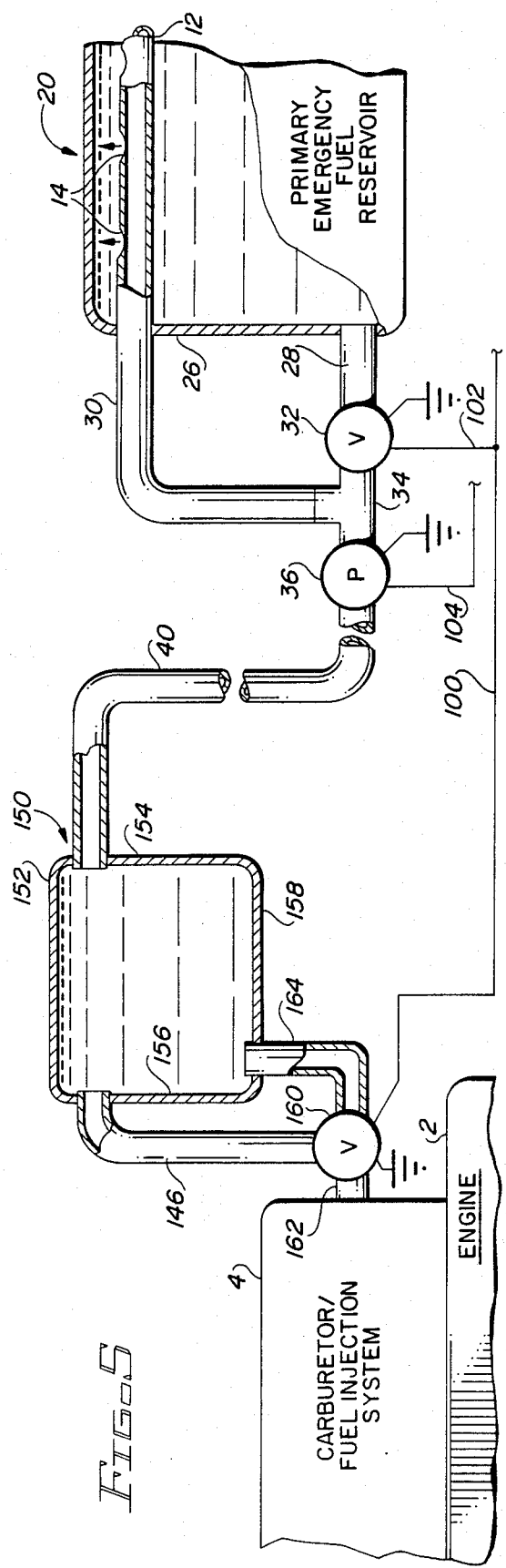
FIG. 5 is an enlarged side view in partial section of portions of the apparatus of FIG. 4.

FIG. 4 is a side view of an alternate embodiment of the emergency fuel tank reservoir apparatus illustrated and discussed above, in conjunction with FIGS. 1, 2, and 3. FIG. 5 is an enlarged view of a portion of the apparatus illustrated in FIG. 4. For the following discussion reference will primarily be made to FIGS. 4 and 5.

In FIGS. 4 and 5, the emergency fuel apparatus includes generally the same elements as shown in FIGS. 1 and 2. That is, the main fuel tank 10 is connected to the primary emergency fuel reservoir 20 by a conduit 12. Moreover, as also indicated above, the emergency fuel reservoir 20 may be disposed within the main fuel tank 10, or it may be located a short distance away from it. However, the primary emergency fuel reservoir 20 is preferably located close to, if not adjacent to, or in, the main fuel tank 10. The primary emergency fuel reservoir 20 is also filled directly from the main fuel tank 10, whether it be through a separate conduit, such as the conduit 12, or by having the primary emergency fuel reservoir 20 disposed within the fuel tank 10.

The fuel conduit 30 extends from the primary emergency fuel reservoir 20 to the conduit 34. A fuel pump 36 is connected to the conduit 34, and pumps fuel through the conduit 40 to a secondary emergency fuel reservoir 150. The secondary emergency fuel reservoir 52 is filled from the secondary emergency fuel reservoir 150, a fuel conduit 146 extends to a valve 160. From the valve 160, a conduit 162 extends to the carburetor or fuel injection system 4 of the engine 2.

The secondary emergency fuel reservoir 150 includes a pair of side walls 154 and 156, a top wall 152 and a bottom wall 158. The main fuel line or conduit 40 extends through the upper portion of the wall 154, to supply fuel to the reservoir 150. The conduit 146 extends through the wall 156, again adjacent to the top, or close to the top 152. An emergency fuel conduit 164 extends to the bottom 158 of the reservoir 150. The conduit 164 extends from the reservoir or tank 150 also to the valve 160.

The valve 160 is an electrically controlled valve having two positions. When the valve 160 is in its "off" state, the conduits 146 and 162 are connected. When the valve 160 is in its "on" state, as when the switch 94 is closed to electrically connect the valve 160 with the conduit 100, the conduit 162 is connected to the conduit 164 to allow fuel from the reservoir 150 to flow to the conduit 162 and to the carburetor or fuel injection system 4. Fuel from the conduit 164 is accordingly not allowed to flow upwardly into the conduit 146 when the valve 160 is in its "on" state.

The electrical controls for the valve 160, as well as for the valve 32 in the conduit 28, is through the switch 94. Again, as in the embodiment of FIGS. 1 and 2, the conduit 28 extends from the primary emergency fuel reservoir 20, adjacent to the bottom of the fuel reservoir 20, to the valve 32. The valve 32 is in turn connected to the "tee" conduit 34. The fuel pump 36 is also connected to the tee conduit 34. When the switch 94 is closed, or is in its "on" state, the valve 32 is actuated from conductor 100 by conductor 102, and the valve 160 is in its "on" state directly from conductor 100. Fuel accordingly begins to flow immediately from both the primary emergency fuel reservoir 20 and from the secondary emergency fuel reservoir 150 to the engine 2. The ounces of fuel in the secondary emergency fuel reservoir 150 provides sufficient fuel to keep the engine 2 running while the fuel from the primary emergency fuel reservoir 20 is being pumped to the engine by the main fuel pump 36. Again, as in the embodiment of FIGS. 1 and 2, the fuel from the primary emergency fuel reservoir 20 flows from the pump 36 through the conduit 40 to the secondary emergency fuel reservoir, and from the secondary emergency fuel reservoir the fuel flows through the valve 160 to the engine 2. The fuel flow from the secondary emergency fuel reservoir 150 is through the conduit 164, the valve 160, and the conduit 162.

After the main fuel tank 10 has been appropriately filled, or refilled as desired, the switch 94 is turned off. When the switch 94 is turned off, the valve 32 closes, or returns to its normally closed, or off state, and the valve 160 also returns to its normally off state, to connect the conduit 146 to the conduit 160. It will be noted that, after the filling or refilling of the main fuel tank 10, it may be highly desirable to leave the switch 94 closed until the user of the apparatus is relatively certain that the secondary emergency fuel tank or reservoir 150, at least, is relatively full to prevent temporary fuel starvation when the valve 160 is turned off, disconnecting the conduit 164 from the conduit 162.

When the switch 94 is closed, actuating the emergency fuel reservoir system, the light 98 will illuminate, as discussed above. When the switch 94 is open, or turned off, the lamp 98 will turn off.

It will be noted that, while the secondary emergency reservoir or tank 150 typically holds only a few ounces, it may be necessary or desirable that its size may be increased to several ounces for use in vehicles equipped with fuel injection systems. The reason for this is, of course, that the fuel supply conduit to which injectors are connected is generally relatively large, and accordingly requires more fuel to fill the conduit. Accordingly, the reservoir holding ten or twelve ounces may be advantageous, or in fact may be necessary.

Regardless of the quantity of fuel in the secondary emergency reservoir or tank 150, the reservoir or tank 150 should be located as close as convenient to either the carburetor or to the fuel injection system to provide fuel as rapidly as possible when the emergency fuel system is activated by closing the switch 94.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. In a vehicle having a main tank, an engine, a main fuel conduit extending from the main fuel tank to the engine, and a fuel pump for pumping fuel from the main fuel tank to the engine, emergency fuel reservoir apparatus, comprising, in combination:

primary emergency fuel tank means adjacent to the main fuel tank for holding a first quantity of fuel;

first conduit means extending between the primary emergency fuel tank means and the main fuel conduit;

first valve means in the first conduit means for controlling the flow of fuel from the primary emergency fuel tank means to the main fuel conduit;

secondary emergency fuel tank means disposed adjacent to the engine for holding a second quantity of fuel;

second conduit means extending between the secondary emergency fuel tank means and the main fuel conduit;

second valve means in the second conduit for controlling the flow of fuel from the secondary emergency fuel tank means to the main fuel conduit; and means for controlling the first valve means and the second valve means.

2. The apparatus of claim 1 in which the first quantity of fuel in the primary fuel tank means is substantially greater than the second quantity of fuel in the secondary fuel tank means.

3. The apparatus of claim 1 in which the second conduit means includes pump means for pumping the second quantity of fuel from the secondary fuel tank means to the main fuel conduit.

4. Fuel apparatus for an engine, comprising, in combination:

a main fuel tank;

primary emergency fuel tank means for holding a first quantity of fuel;

secondary emergency fuel tank means disposed adjacent to the engine for holding a second quantity of fuel;

main fuel conduit means extending from the main fuel tank to the engine and through the primary and secondary emergency fuel tank means for providing the primary and secondary emergency fuel tank means with fuel;

a main fuel pump for pumping fuel from the main fuel tank in the main fuel conduit means;

first conduit means extending between the primary emergency fuel tank means and the main fuel conduit;

first valve means for controlling the flow of fuel in the first conduit means;

second conduit means extending from the secondary emergency fuel tank means to the main fuel pump;

second valve means for controlling the flow of fuel in the second conduit means; and means for actuating the first and second valve means for providing the first and second quantities of fuel for the engine.

5. The apparatus of claim 4 in which the main fuel pump is disposed in the main fuel line between the first conduit means and the secondary fuel tank means.

6. The apparatus of claim 4 in which the secondary emergency fuel tank means is disposed adjacent to the engine for providing the second quantity of fuel to the engine substantially immediately upon the actuation of the second valve means.

7. The apparatus of claim 4 in which the second conduit means includes fuel pump means for pumping the second quantity of fuel from the secondary fuel tank means to the main fuel conduit and to the engine.

8. The apparatus of claim 4 in which the primary emergency fuel tank means is disposed adjacent to the main fuel tank.

9. The apparatus of claim 4 in which the means for actuating the first and second valve means includes switch means connected to the first and second valve means for actuating the first and second valves substantially simultaneously.

10. The apparatus of claim 9 in which the second conduit means includes a pump for pumping the second quantity of fuel from the secondary emergency fuel tank means to the main fuel line, and the means for actuating the first and second valve means further includes means for actuating the pump substantially simultaneously with the actuation of the first and second valve means.

11. Fuel apparatus for a vehicle having an engine, comprising, in combination:

a main fuel tank for holding a first quantity of fuel;

a primary emergency fuel tank for holding a second quantity of fuel;

a secondary emergency fuel tank disposed adjacent to the engine for holding a third quantity of fuel;

first fuel conduit means extending from the main fuel tank to the primary emergency fuel tank and to the secondary emergency fuel tank for providing fuel to the primary and secondary emergency fuel tanks;

second fuel conduit means for extending from the secondary emergency fuel tank means to the engine for providing fuel to the engine;

third fuel conduit means extending from the primary emergency fuel tank to the first fuel conduit means for providing a first flow of emergency fuel from the primary emergency tank to the first fuel conduit;

fuel pump means in the first fuel conduit means for pumping fuel from the main fuel tank and the primary emergency fuel tank to the engine;

first valve means in the third fuel conduit means for controlling the first flow of emergency fuel from the primary emergency fuel tank to the first fuel conduit means;

fourth fuel conduit means extending from the secondary emergency fuel tank to the second fuel conduit means for providing a second flow of emergency fuel from the secondary emergency fuel tank to the second fuel conduit means while the first flow of emergency fuel is flowing from the primary emergency fuel tank; and second valve means in the fourth fuel conduit for controlling the second flow of emergency fuel from the secondary emergency fuel tank to the second fuel conduit means.

12. The apparatus of claim 11 in which the first fuel conduit means extends through the primary emergency fuel tank means for filling the primary emergency fuel tank.

13. The apparatus of claim 12 in which the first fuel conduit means includes apertures within the primary fuel tank through which fuel flows to fill the primary emergency fuel tank.

14. The apparatus of claim 11 in which the first and second valve means include first and second valves, respectively, and the first and second valves are remotely actuable for providing the first and second flows of emergency fuel.

15. The apparatus of claim 11 in which the secondary emergency fuel tank is disposed above the engine to provide for the gravity flow of the second emergency flow of fuel.

16. The apparatus of claim 11 in which the fuel pump means is disposed in the first fuel conduit means between the third fuel conduit means and the secondary emergency fuel tank.

* * * * *